(12) United States Patent  (10) Patent No.: US 7,165,300 B2
Phillips et al.  (45) Date of Patent: Jan. 23, 2007

(54) PORTABLE POCKET CUTTER

(75) Inventors: Alan Phillips, Jackson, TN (US); John W. Schnell, Anderson, SC (US); Daniel Paxton Wall, Humboldt, TN (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 11/194,908

(22) Filed: Aug. 1, 2005

(65) Prior Publication Data

US 2006/0032035 A1  Feb. 16, 2006

Related U.S. Application Data

(60) Provisional application No. 60/600,078, filed on Aug. 9, 2004.

(51) Int. Cl.
*B23P 23/00* (2006.01)

(52) U.S. Cl. ............... 29/26 B; 144/3.1; 144/35.2; 409/178; 408/103

(58) Field of Classification Search ............... 29/26 B, 29/33 R; 409/178, 180, 182; 408/103, 24, 408/25, 26, 30, 44, 51; 144/3.1, 35.2, 134.1, 144/136.1, 367, 368, 371, 48.5, 48.6, 48.7, 144/345, 350, 39.1, 92, 104
See application file for complete search history.

(56) References Cited

U.S. PATENT DOCUMENTS

| 1,335,544 | A | 3/1920 | Anders |
| 1,602,658 | A | 10/1926 | Germain |
| 3,496,974 | A | 2/1970 | Munsil et al. |
| 3,675,312 | A | 7/1972 | Herman |
| 4,603,719 | A | 8/1986 | Durney |
| 5,063,982 | A | 11/1991 | Durney |
| 5,375,636 | A | 12/1994 | Bosten et al. |
| 5,553,645 | A | 9/1996 | Durney |
| 6,599,064 | B1 | 7/2003 | Robinson |

*Primary Examiner*—Dana Ross
(74) *Attorney, Agent, or Firm*—Mehul R. Jani; Adan Ayala

(57) ABSTRACT

A portable pocket cutter employs a shaping assembly and a boring assembly, connected via a frame and coupling assembly, for constructing a pocket joint in a workpiece. The frame is at least partially supported upon a workpiece. The shaping assembly is pivotally connected with the frame and further connects with a first bit for shaping a recess in a planar surface of the workpiece. The boring assembly is also connected with the frame and further connects with a second bit for boring a through aperture into an edge of the workpiece, the edge being generally perpendicular to the planar surface.

20 Claims, 6 Drawing Sheets

PORTABLE POCKET CUTTER

CROSS-REFERENCE TO RELATED APPLICATIONS

The present application claims priority under 35 U.S.C. § 119(e) to U.S. Provisional Application No. 60/600,078 entitled: Portable Pocket Cutter filed Aug. 9, 2004, which is hereby incorporated by reference in its entirety.

FIELD OF THE INVENTION

The present invention generally relates to the field of woodworking, and particularly to power tools, such as a portable pocket cutter, for performing various operations upon workpieces.

BACKGROUND OF THE INVENTION

Often woodworkers employ a pocket joint for the hidden joining of workpieces, such as two pieces of wood. An advantage of using the pocket joining method is the elimination of external clamping and glue set up time. Pocket joints are often used to establish strong joints, such as the securing of face frames or table tops to support rails. Generally, there are two types of pocket cutters, the large production machines or clamp devices utilized with separate drills.

Unfortunately, the large production machines are configured in a manner which is not conducive to their transportation and relocation in various positions or among different work sites. Further, many of the conventional devices which employ drills to establish pocket joints do not operate from the edge of the work to be joined. This may result in increased time spent in trying to establish pocket joints and, may further result in increased occurrences of inaccurately established pocket joints. Another limitation of many currently available pocket cutters may be that they employ a single motor to perform multiple functions. Still a further limitation of many currently available pocket cutters is that they establish the pilot hole at a shallow angle relative to the joined surface, which may increase the occurrence of mismatch of the "show" surfaces when joined and may require the use of clamps when driving the screw to couple the two workpieces.

Therefore, it would be desirable to provide a portable pocket cutter which is more easily transported and relocated in various positions and among different worksites. Further, it would be desirable to provide a portable pocket cutter which operates from the edge of a workpiece to be joined and may employ at least two motors to perform the various functions of the portable pocket cutter. Still further, it would be desirable to provide a portable pocket cutter for providing the pilot hole perpendicular to the surface to be joined.

SUMMARY OF THE INVENTION

A portable pocket cutter of the present invention provides a portable, lightweight "take-to-work" tool. The portable pocket cutter is easy to transport and relocate due to the configuration of the tool. In operation, the portable pocket cutter operates from above the workpiece and at the edge of a workpiece where a pocket joint is to be established. This operating method is unconventional as compared to many currently available pocket cutters and may provide significant advantages in saved time and labor of the user.

In a first aspect of the present invention, a portable pocket cutter for constructing a pocket joint in a workpiece is provided. The portable pocket cutter includes a frame connected with a shaping assembly and a boring assembly. The shaping assembly provides for the forming of a recess or pocket in the workpiece, via a shaping (e.g.—router) bit and the boring assembly provides for the forming of a through aperture from an edge of the workpiece into the recess via a boring (e.g.—drill) bit.

In a second aspect of the present invention, a portable pocket cutter for constructing a pocket joint in a workpiece is provided. The portable pocket cutter includes a frame connected with a router assembly and a drill assembly. The router assembly provides for the forming of a recess or pocket in the workpiece and the boring assembly provides for the forming of a through aperture or pilot hole from an edge of the workpiece into the recess. Further, a coupling assembly is connected with the frame and connects the router assembly with the drill assembly. The coupling assembly provides an apparatus for selectively engaging the router assembly or drill assembly.

In a third aspect of the present invention, a portable pocket cutter for constructing a pocket joint in a workpiece is provided. The portable pocket cutter includes a frame connected with a first sleeve for removably coupling with a shaping device and a second sleeve for removably coupling with a boring device. The shaping device provides for the forming of a pocket or recess in the workpiece and the boring device provides for the forming of a through aperture or pilot hole from an edge of the workpiece into the recess.

In a fourth aspect of the present invention a method for forming a pocket joint in a workpiece is provided. In a first step a portable pocket cutter is located on an edge of a workpiece. A second end of a frame of the portable pocket cutter is at least partially engaged with a planar surface of the workpiece. After the portable pocket cutter is located, a recess or pocket is formed by engaging a shaping assembly including a first bit into the planar surface of the workpiece. A through aperture or pilot hole is formed by engaging a boring assembly including a second bit into the edge of the workpiece generally perpendicular to the recess.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Figure 1:
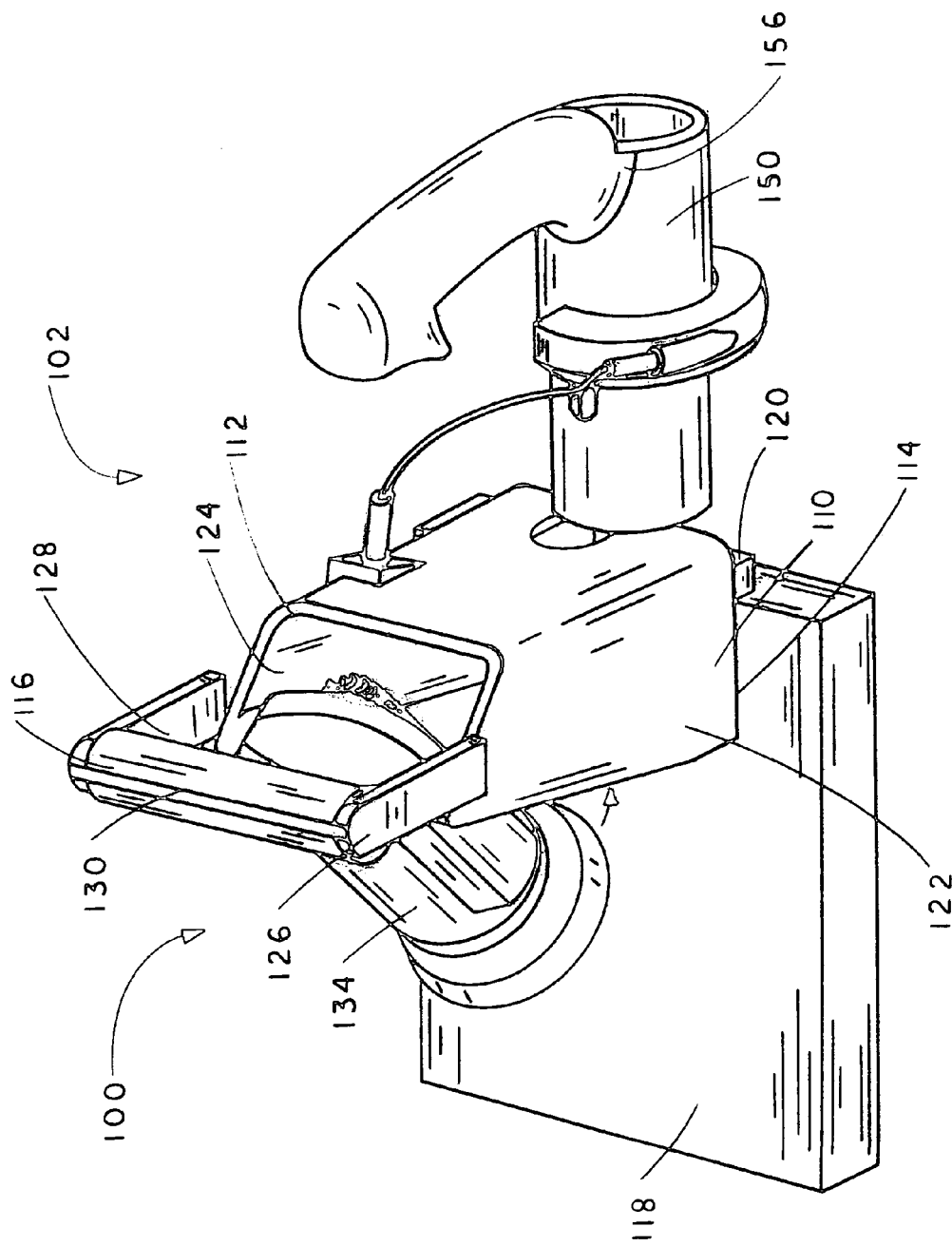
FIG. 1 is an isometric illustration of a portable pocket cutter established in a first operational position in accordance with an exemplary embodiment of the present invention.

Reference will now be made in detail to the presently preferred embodiments of the invention, examples of which are illustrated in the accompanying drawings.

Referring generally now to FIGS. 1 through 6, exemplary embodiments of the present invention are shown. In a present embodiment, the portable pocket cutter 100 includes a frame 102 coupled with a shaping assembly 104 and a boring assembly 106. In further embodiments, the portable pocket cutter 100 also includes a coupling assembly 108 which connects the shaping assembly 104 with the boring assembly 106.

In a current embodiment, the frame 102 includes a body 110 having a first end 112 and a second end 114, the body further being connected with a handle 116. The handle 116 is configured for stabilizing the portable pocket cutter 100 and may be coupled with the body 110 of the frame 102 proximal to the first end 112. The handle 116 is established in relation to an outer wall 122 of the frame 102, proximal to the first end 112 of the body 110. The handle 116 includes a first arm 126 and a second arm 128 coupled by a grip 130. The first and second arms (126, 128) connect on opposite sides of the first end 112 of the body 110. The handle 116 may be connected by the use of fasteners, such as bolts, screws, clips, pins, and the like. Alternatively, the handle 116 may be connected to the body 110 via a fastening assembly, such as a compression lock assembly, snap fit assembly, latch assembly, or the like. In the current embodiment, the handle 116 is integral with the body 110. In further embodiments, the handle 116 is adjustably coupled with the body 110 so as to provide a handle 116 which may be individually positioned to assist in increasing the comfort and ease of operation of the portable pocket cutter 100. In additional embodiments, the grip 130 may include contouring, grooves, raised sections, or the like. In further embodiments, the grip 130 may include a material coupled to the grip to aid in grasping by the user and to further assist in increasing user comfort and ease of use of the portable pocket cutter 100.

The second end 114 of the body 110 is designed for being at least partially supported upon a surface of a workpiece 118 into which a recess is to be formed. In further embodiments, the second end 114 of the body 110 may be constructed with a non-marring material so as not to damage a surface of a workpiece upon which the portable pocket cutter 100 is positioned. It is contemplated that other configurations for the first and second ends (112, 114) of the frame 102 may be employed. In additional embodiments, the second end 114 may include one or more alignment stops 120 for positioning the frame 102 against an edge of the workpiece 118 through which a screw will extend. The alignment stops 120 may be designed to ensure proper alignment of the frame 102, the shaping assembly 104 and the boring assembly 106 relative to the workpiece 118 for forming a pocket joint. It is further contemplated that the body 110 may include a visual indicator, such as a marking, a surface protrusion, a surface groove formed therein or the like for ensuring proper alignment of the portable pocket cutter with respect to a workpiece.

In present embodiments, the body 110 of the frame 102 is a unitary, generally U-shaped body having an outer wall 122 and an inner wall 124. The boring assembly 106 is connected with the body 110 of the frame 102 via the outer wall 122, while the shaping assembly 104 is coupled with the body 110 of the frame 102 via the inner wall 124. Alternative configurations of the body 110 may be employed without departing from the scope and spirit of the present invention.

In a current embodiment, the shaping assembly 104 includes a first motor 132, at least partially disposed within a first housing 134. The first motor 132 is connected with a first bit coupling assembly 136, which couples with and drives a first bit 138 suitable for cutting an arc-shaped recess into a workpiece 118. In an exemplary embodiment, the shaping assembly 104 is pivotally connected with the frame 102 and rotates in an arc-like path about an axis, the axis extending in a direction generally parallel to an edge of the workpiece 118 through which a screw will extend. The shaping assembly 104 may be positioned along an arc-like range of motion between a fully disengaged position and a fully engaged position. In the fully disengaged position, the bit 138 is positioned at a maximum distance away from the workpiece 118 and is oriented generally perpendicular to the frame 102 and generally parallel to the surface into which a recess is to be formed. In the fully engaged position, the bit 138 is positioned at a maximum depth within the workpiece 118 and is oriented generally parallel to the frame 102 and generally perpendicular to the surface into which a recess is to be formed. The range of motion may include positioning the shaping assembly 104 at a series of angles between approximately 0 and 90 degrees with respect to the body 110 of the frame 102. In an exemplary embodiment, the shaping assembly 104 is biased, such as by torsion springs, towards the disengaged position for preventing inadvertent engagement of the bit 138 with a workpiece 118. (as shown in FIG. 1). Further, the inner wall 124 of the frame may be configured with one or more stops which are positioned to stop the shaping assembly 104 at a 0 degree angle with respect to the body 110 of the frame 102 and prevent the bit 138 from forming a recess which intersects an edge of the workpiece 118 through which a screw will extend. It is contemplated that the shaping assembly 104 to may be fixedly located, via an adjustable coupling mechanism, at any of the degrees within the range of motion allowed by the present invention. In additional embodiments, the shaping assembly 104 may further be coupled with a handle for allowing a user to position the shaping assembly between the disengaged and fully engaged positions.

In a present embodiment, the boring assembly 106 includes a second motor 140, at least partially disposed within a second housing 142. The second motor 140 is connected with a second bit coupling assembly 144, which couples with and drives a second bit 146 suitable for boring a "pilot" aperture in a longitudinal direction generally perpendicular to the body 110 of the frame 102 and generally perpendicular to an edge of the workpiece 118. The "pilot" aperture is used for accepting a joining screw. The boring assembly 106 further includes a handle 148 connected with the second housing 142 for directing the boring assembly in both a forward and reverse longitudinal direction generally perpendicular to an edge of the workpiece 118. In an exemplary embodiment, the second housing 142 is at least partially disposed within a guide member 150, which is connected with the frame 102 of the portable pocket cutter 100, proximal to the second end 114. The second housing 142 is slidably coupled within the guide member 150, to allow for the forward/reverse longitudinal movement of the boring assembly 106 along an axis extending generally perpendicular to an edge of the workpiece. In further embodiments, the second housing 142 may be coupled within a sleeve member, the sleeve member being slidably coupled within the guide member 150, to allow for the forward/reverse longitudinal movement of the boring assembly 106 along an axis extending generally perpendicular to an edge of the workpiece 118. The boring assembly 106 may be slidably positioned between a fully engaged position, in which the bit 146 of the boring assembly 106 is positioned at a maximum depth within the workpiece, and a fully disengaged position, in which the boring assembly 106 is positioned at a maximum distance away from the workpiece. The guide member 150 is further configured with a guide slot 156 for providing clearance for the handle 148 when directing the boring assembly 106 towards the fully engaged position. It is contemplated that the boring assembly 106 may be biased, such as by a spring bias assembly, towards a fully disengaged position for preventing the bit 146 of the boring assembly from inadvertently engaging with a workpiece 118.

In an exemplary embodiment, the portable pocket cutter 100 is able to retro-fit various tools for performing shaping and boring operations. In an alternative embodiment, the shaping assembly 104 comprises a first sleeve coupled with the frame 102 configured for receiving and securing a shaping tool, such as a router. For example, the first sleeve may be configured for removably coupling a motor housing of a router. For example, the first sleeve may secure the router by constricting around the motor housing of the router via a clamping mechanism or the like. In additional embodiments, the boring assembly 106 comprises a second sleeve coupled with the frame 102 having a circular cross-section configured for receiving and securing a motor housing of a boring tool, such as a drill. The first and second sleeves allow a user to utilize or retro-fit an already owned device, such as a standard shaping assembly or boring assembly, for use with the portable pocket cutter 100.

Figure 2:
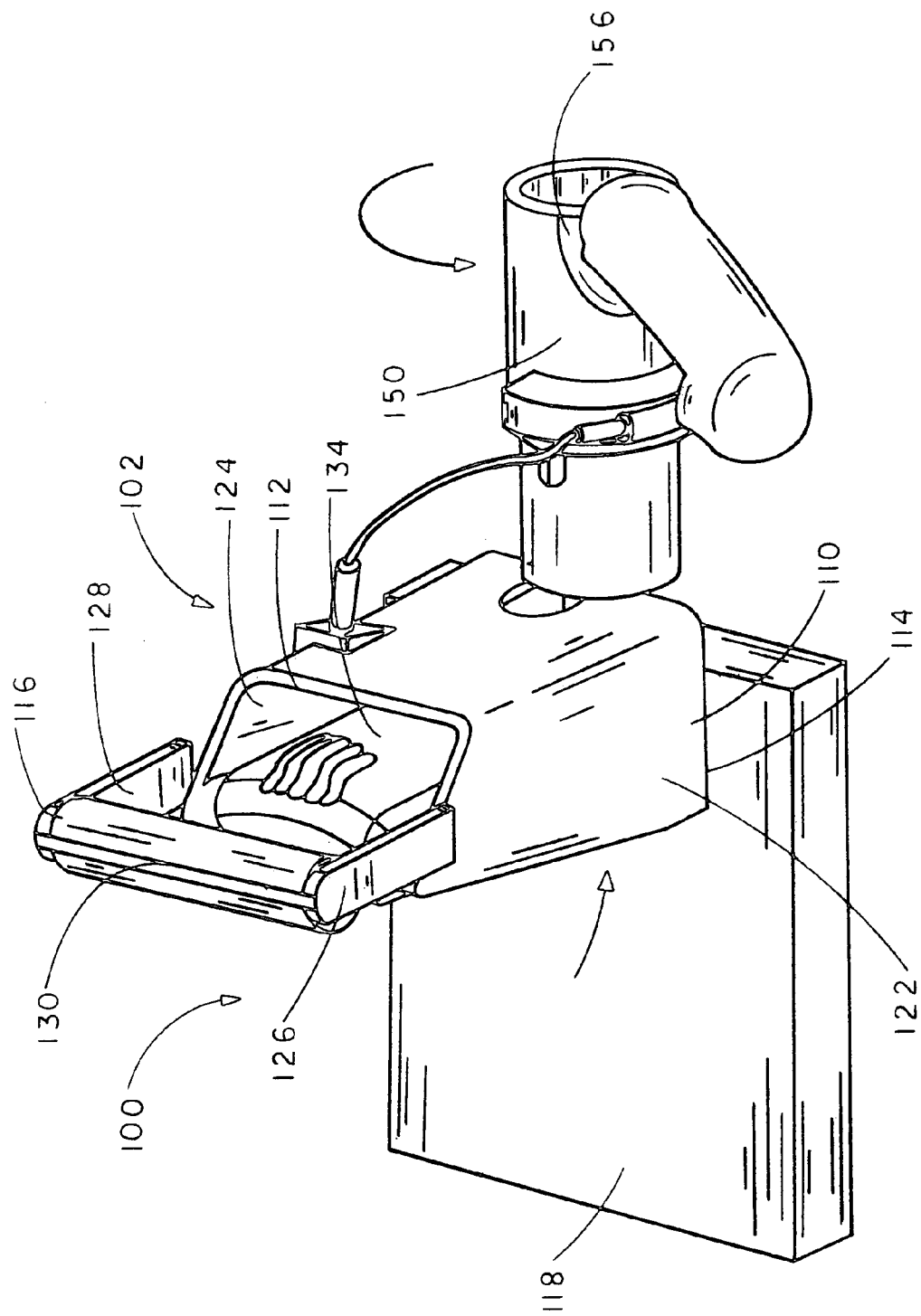
FIG. 2 is an isometric illustration of a portable pocket cutter established in a second operational position in accordance with an exemplary embodiment of the present invention.
Figure 3:
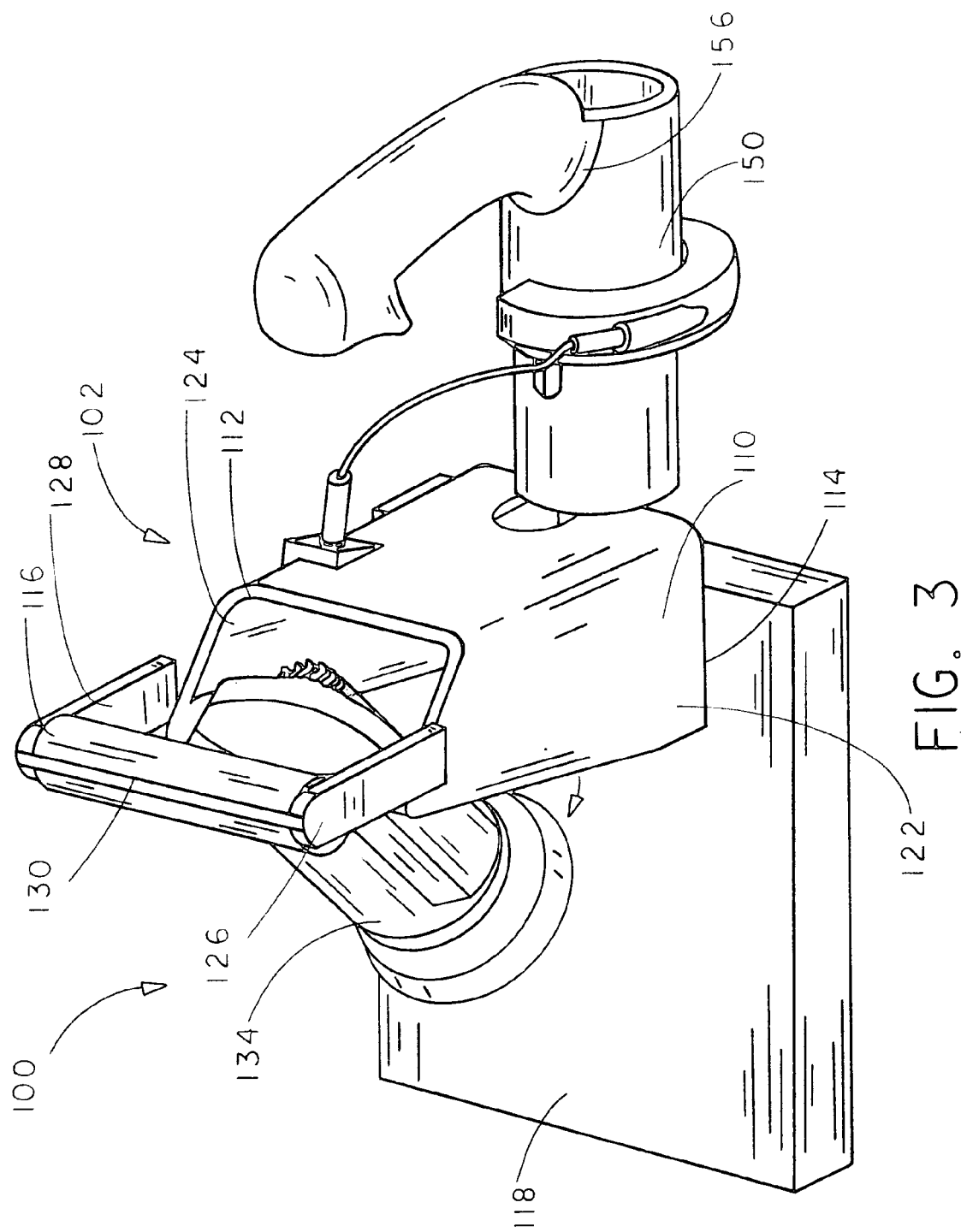
FIG. 3 is an isometric illustration of a portable pocket cutter established in accordance with an exemplary embodiment of the present invention.
Figure 4:
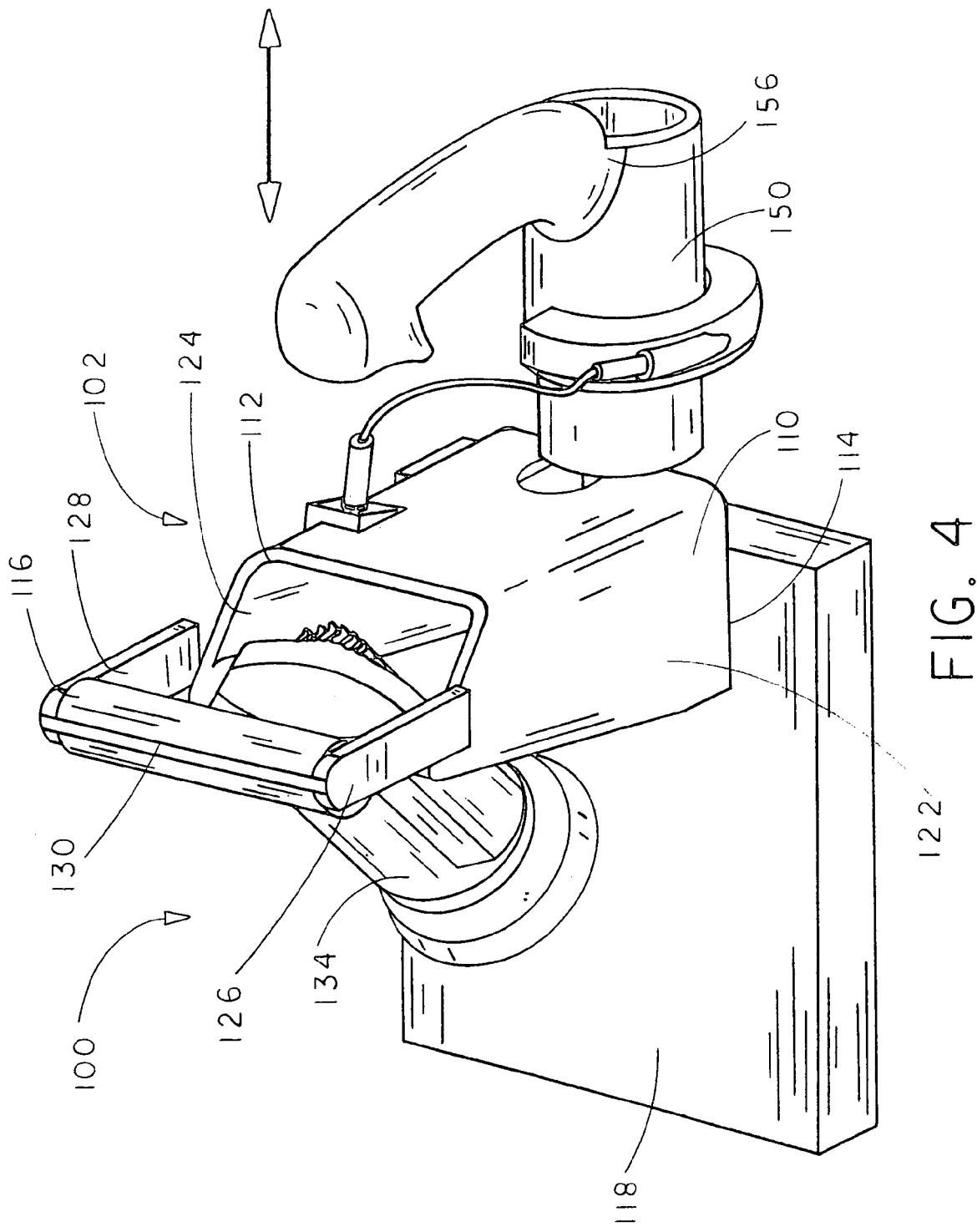
FIG. 4 is an isometric illustration of a portable pocket cutter established in a third operational position in accordance with an exemplary embodiment of the present invention.
Figure 5:
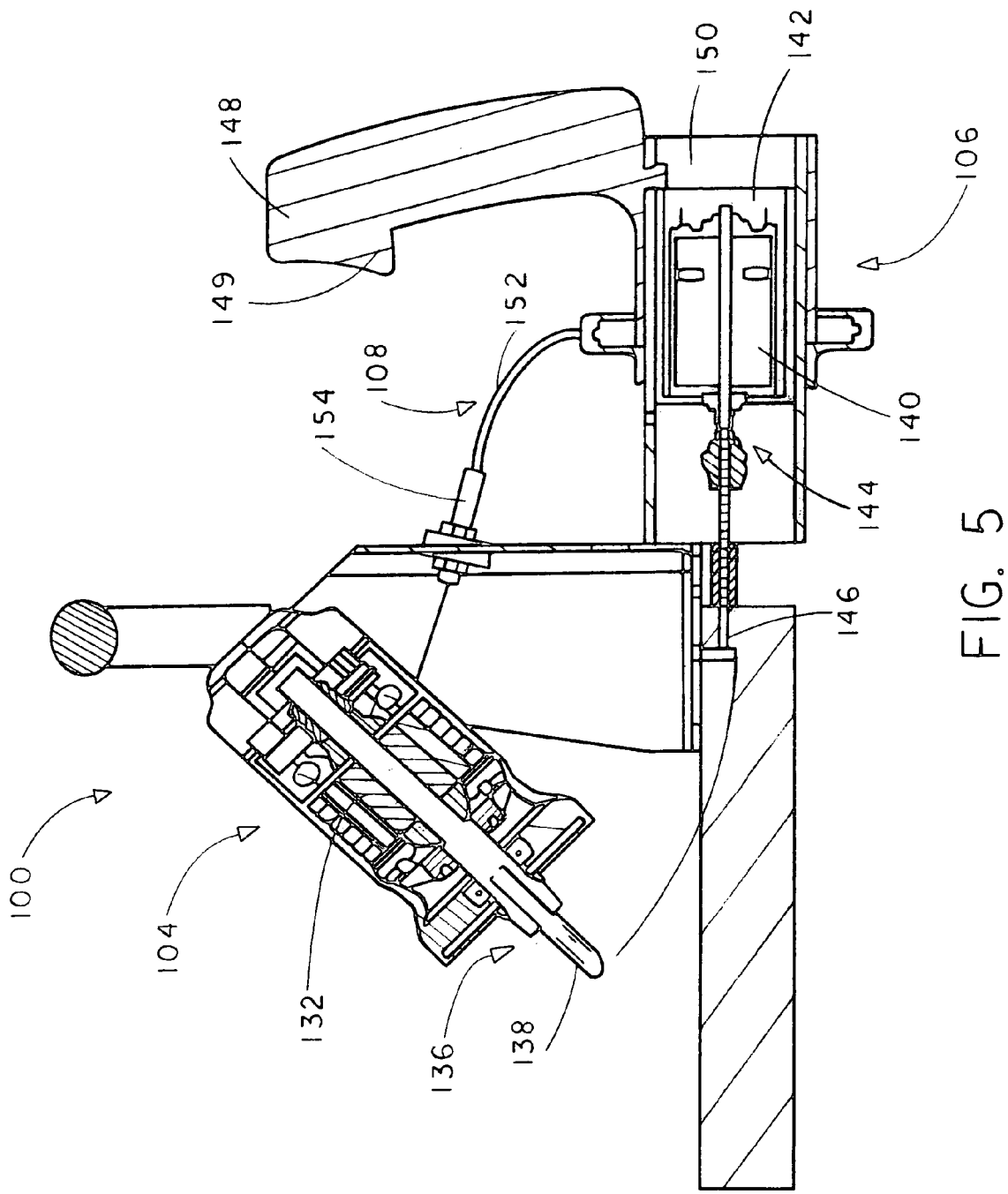
FIG. 5 is a cut-away side elevation view illustrating the portable pocket cutter engaging the workpiece in accordance with an exemplary embodiment of the present invention.
Figure 6:
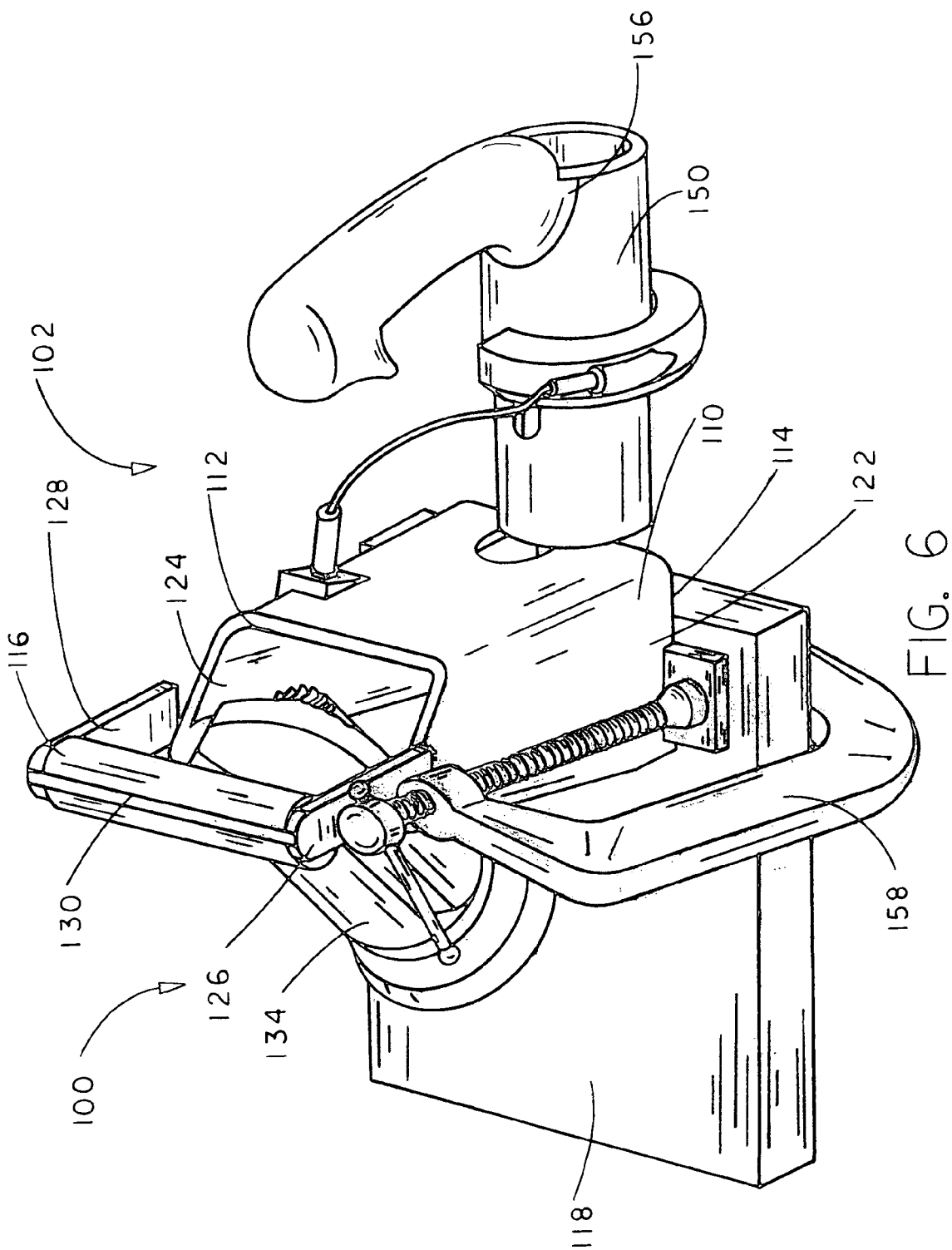
FIG. 6 is an illustration of a portable pocket cutter including a clamping assembly in accordance with an exemplary embodiment of the present invention.

In further embodiments, a coupling assembly 108 operationally couples the shaping assembly 104 with the boring assembly 106. In an exemplary embodiment, the coupling assembly 108, such as a cable 152, is coupled on a first end with the shaping assembly 104 and further couples through the body 110 of the frame 102, via a directing housing 154, to connect a second end of the coupling with the boring assembly 106. Preferably, the first end of the coupling assembly 108 is coupled with the shaping assembly 104 remote from the axis about which the shaping assembly pivots. The coupling assembly 108 promotes ease of use of the portable pocket cutter by allowing a user to selectively position and control both the shaping assembly 104 and the boring assembly 106 by merely manipulating the handle 148 coupled with the boring assembly 106. In an exemplary embodiment, the handle 148 of the boring assembly 106 is configured so that it may be rotated from a first position (as shown in FIG. 1), into a second position (as shown in FIG. 2) This positioning of the handle 148 causes the coupling assembly 108 to direct the shaping assembly 104, against its biasing force, from a fully disengaged position (as shown in FIG. 1) into a fully engaged position (as shown in FIG. 2) for forming an arc-shaped recess in a surface of the workpiece 118. The handle 148 may then be rotated back to the first position, which then directs the shaping assembly 104 into the fully disengaged position. A user can further manipulate the handle 148 in a forward or reverse motion as necessary, to direct the boring assembly 106 into or out of the workpiece 118 for forming a pilot hole. It is contemplated that in embodiments in which a biasing force biases the boring assembly 106 towards a fully disengaged position, such biasing force is not overcome by rotational movement of the handle 148 as described above. In further embodiments, a locking mechanism may be included for preventing rotation of the handle 148 when the boring assembly 106 is directed towards a fully engaged position.

It is contemplated that the coupling assembly 108 may include an interlock mechanism whereby the forces applied to the cable 152 of the coupling assembly 108 either during the operation of establishing the recess or the pilot hole, may determine the operational status of the motor 132 of the shaping assembly 104 and the motor 140 of the boring assembly 106. It is further contemplated that the coupling assembly 108 may include an automatic operations assembly which allows the user of the portable pocket cutter 100 to determine the overall operation of the portable pocket cutter through a user interface. The user interface may use various technologies, such as selector assemblies which provide buttons for interfacing by the user.

The connection of the boring assembly 106 with the frame 102, via the guide member 150, aligns the boring device 106 so that the second bit 146 provides a pilot hole which is in a generally perpendicular orientation relative to the surface to be joined, or perhaps at a slight angle. Thus, the present invention may assist in minimizing mismatch of the show surfaces when joined and in minimizing the need for clamps when driving the screw into and through the pilot hole.

In an exemplary embodiment, the boring assembly 106 is coupled via a second adjustable coupling mechanism with the outer wall 122 of the frame 102. The coupling of the boring assembly 106 with the frame 102 is established so that a drill bit 146 coupled with the boring assembly is optimally located for boring into a workpiece 118 and establishing a pilot hole in operational concert with the pocket established by the shaping assembly 104. In further embodiments, the guide member 150 is connected with the second adjustable coupling mechanism. In alternative embodiments, the boring assembly 106 connects directly with the adjustable coupling mechanism. Preferably, the positioning of the boring assembly 106 allows the pilot hole to be bored in a generally perpendicular orientation with respect to the surface to be joined. In alternative embodiments, the positioning of the boring assembly 106 may allow the pilot hole to be formed in various orientations with respect to the surface to be joined.

In a current embodiment, the guide member 150 aids in the functioning of the boring assembly 106. However, the boring assembly 106 may be connected in an integral manner with the guide member 150, thereby allowing the boring assembly to directly connect with the second adjustable coupling mechanism, frame 102, and coupling assembly 108. It is contemplated that the connection of the boring assembly 106 with the frame 102 may be a direct connection, providing the boring assembly 106 in a fixed position relative to the frame 102.

It is contemplated that the second adjustable coupling mechanism may provide for the boring assembly 106 to be adjustably positioned with respect to the outer wall 122 of the frame 102. In a preferred embodiment, the second adjustable coupling mechanism provides a fixed location for the boring assembly 106 with respect to the outer wall 122 of the frame 102. Further, in the current embodiment, the boring assembly 106 is coupled with the outer wall 122 of the frame 102, proximal to the second end 114. This allows the boring bit 146 to extend below the second end 114 of the frame 102 and engage the workpiece 118 upon which at least a portion of the second end 114 of the frame 102 is seated. In the alternative, the outer wall 122 of the body 110 and the second end 114 may include an aperture formed therein for allowing the bit 146 to engage with the workpiece 118 via the aperture. For example, the outer wall 122 and second end 114 may include an aperture which allows the bit 146 to extend through the aperture formed within the body 110 and engage the workpiece 118.

In alternative embodiments, the housing 142 of the boring assembly 106 provides the connection with the coupling assembly 108 and frame 102 to allow for operation of the boring assembly 106 without requiring a guide member 150. Preferably, the connection of the guide member 150 with the frame 102 is an adjustable connection allowing the guide member 150 to move generally perpendicular to a surface of a workpiece into which a recess is to be formed. It is contemplated that this adjustable movement of the guide member 150 is accomplished through use of a slot cut into the body 110 of the frame 102 which allows for the movement. Further, various fastening devices and technologies may be employed to secure the position of the guide member 150 relative to the slot. For example, screws may be used to connect and secure the position of the guide member 150. Alternatively, bolts and nuts, clips, pins, and the like, which secure the position of the guide member 150 may be employed. Fastening technologies, such as a compression lock system, friction fit system, snap fit system, and the like, may enable a user to more quickly and easily set and release the position of the guide member 150.

In a current embodiment, the guide member 150 allows the boring assembly 106, including the handle 148, to move within it. In an exemplary embodiment, the movement allowed is rotational and slidable movement. In an alternative embodiment, the guide member 150 may only allow the boring assembly 106 to slidably move within it. Preferably, the guide member 106 is constructed to allow a boring assembly 106 to properly function in accordance with the present invention. In the alternative, the boring assembly 106 may be generally configured to optimally function in conjunction with the guide member 150. Thus, the configuration of the housing 142 of the boring assembly 106 is at least partially defined by the capability of at least a portion of the housing to be movably disposed within the guide member 150. The overall length of the boring assembly 106 may be established in accordance with the functional requirement of enabling the bit 146 to establish a particular bore, having a specific width and length, within a workpiece 118. The overall width of the housing 142 is configured to accommodate at least a portion of the housing 142 being received within the guide member 150.

In a preferred embodiment, the drilling of the pilot hole is accomplished by the adjustable coupling of the boring assembly 106, including the handle 148 connected with the housing 142 of the boring assembly 106, with the guide member 150. This adjustable coupling allows the handle 148 and motor assembly 106 to slide back and forth and rotate with respect to the guide member 150. It is understood that the adjustable coupling may allow only the sliding capabilities in an alternative embodiment.

The movement capabilities give the user the ability to engage the handle 148 and through movement of the handle cause the bit 146 to be engaged with the workpiece 118 for boring the pilot hole and then allow the user to remove the bit 146 from the workpiece 118 after the pilot hole is established. In the current embodiment, the handle 148 and boring assembly 106 may be a single contiguous unit. Alternatively, the handle 148 may be coupled with the boring assembly 106 in a removable manner. In further embodiments, the handle 148 may include a trigger 149, which, when depressed powers one or both of the first motor 132 and the second motor 140.

Additionally, the present invention may include a clamp assembly 158 which allows the user to secure the position of the portable pocket cutter 100 upon the workpiece 118. The clamp assembly 158 may be integral with the portable pocket cutter 100 and may be a c-clamp, a quick clamp, a bar clamp or the like A method of establishing a pocket joint is provided by the present invention. In a first step the portable pocket cutter 100 is established upon a planar surface and proximal to an edge of a workpiece 118. The shaping assembly 104, coupled with a bit 138, is engaged and forms a recess into the workpiece 118. After the recess is formed, the boring assembly 106, coupled with a bit 146, is engaged and bores a pilot hole into an edge of the workpiece 118 into which a screw will extend, generally perpendicular to the recess.

In the alternative, after the portable pocket cutter 100 is established above and at the edge of the workpiece 118, the boring assembly 106 may construct the pilot hole and then the shaping assembly 104 may construct the recess. In an additional step, the position of the boring assembly 106 relative to a frame 102 of the portable pocket cutter 100 and the workpiece 118 may be determined by a user.

It is further contemplated that the method may further comprise a step of retro-fitting a secondary assembly in place of either the shaping or boring assemblies (104, 106). The retro-fitting may include the step of selecting a secondary motor assembly and connecting the first or second bit (138, 146) with the secondary motor assembly (106).

It is understood that the specific order or hierarchy of steps in the methods disclosed are examples of exemplary approaches. Based upon design preferences, it is understood that the specific order or hierarchy of steps in the method can be rearranged while remaining within the scope and spirit of the present invention.

It is believed that the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof.

What is claimed is:

1. A portable pocket cutter for forming a pocket joint in a workpiece, comprising:
   a frame including a body having a first end and a second end, the second end configured for being supported upon a planar surface of the workpiece;
   a shaping assembly connected with the frame, the shaping assembly for shaping a recess in the planar surface of the workpiece; and
   a boring assembly connected with the frame, the boring assembly for boring a through aperture into an edge of the workpiece in a generally perpendicular orientation with respect to the edge of the workpiece, the edge being generally perpendicular to the planar surface, wherein at least one of the shaping assembly and the boring assembly is biased by a biasing element towards the disengaged position.

2. The portable pocket cutter of claim 1, further comprising a coupling assembly for connecting the shaping assembly and the boring assembly.

3. The portable pocket cutter of claim 1, further comprising a handle for stabilizing the portable pocket cutter, the handle being connected proximal to the first end of the body of the frame.

4. The portable pocket cutter of claim 1, further comprising a guide member connected with the frame.

5. The portable pocket cutter of claim 1, wherein the shaping assembly is a router assembly.

6. The portable pocket cutter of claim 1, wherein the boring assembly is a drill assembly.

7. The portable pocket cutter of claim 1, wherein the boring assembly includes a handle for directing the boring assembly for boring the through aperture into the workpiece.

8. The portable pocket cutter of claim 1, wherein the shaping assembly and the boring assembly are removably coupled with the frame.

9. The portable pocket cutter of claim 1, wherein the second end of the body of the frame further includes a stop for aligning the workpiece with respect to the portable pocket cutter.

10. The portable pocket cutter of claim 1, wherein the shaping assembly is pivotally coupled with the frame.

11. A portable pocket cutter for forming a pocket joint in a workpiece, comprising:
    a frame including a body having a first end and a second end, the second end configured for being supported upon a planar surface of the workpiece;
    a shaping assembly connected with the frame, the shaping assembly for shaping a recess in the planar surface of the workpiece;
    a boring assembly connected with the frame, the boring assembly for boring a through aperture into an edge of the workpiece in a generally perpendicular orientation with respect to the edge of the workpiece, the edge being generally perpendicular to the planar surface; and
    a coupling assembly connected to the frame for connecting the shaping assembly with the boring assembly thereby allowing a user to adjust both the shaping assembly and the boring assembly via adjustment of either the boring assembly or the shaping assembly.

12. The portable pocket cutter of claim 11, further comprising a handle for stabilizing the portable pocket cutter, the handle being connected proximal to the first end of the body of the frame.

13. The portable pocket cutter of claim 11, further comprising a guide member connected with the frame.

14. The portable pocket cutter of claim 11, wherein the shaping assembly is a router assembly.

15. The portable pocket cutter of claim 11, wherein the boring assembly is a drill assembly.

16. The portable pocket cutter of claim 11, wherein the boring assembly includes a handle for directing the boring assembly for boring the through aperture into the workpiece.

17. The portable pocket cutter of claim 11, wherein the shaping assembly and the boring assembly are removably coupled with the frame.

18. The portable pocket cutter of claim 11, wherein the second end of the body of the frame further includes a stop for aligning the workpiece with respect to the portable pocket cutter.

19. The portable pocket cutter of claim 11, wherein the shaping assembly is pivotally coupled with the frame.

20. A portable pocket cutter for forming a pocket joint in a workpiece comprising:
    means for forming a recess within a planar surface of the workpiece;
    means for boring a through aperture into an edge of the workpiece in a generally perpendicular orientation with respect to the edge of the workpiece, the edge being generally perpendicular to the planar surface; and
    means for connecting the forming means with the boring means, the connecting means allows a user to adjust both the forming means and the boring means via adjustment of either the boring means or the forming means.

* * * * *